United States Patent
Barra et al.

(10) Patent No.: US 11,598,270 B2
(45) Date of Patent: Mar. 7, 2023

(54) METHOD FOR OPERATING A DRIVE DEVICE AND CORRESPONDING DRIVE DEVICE

(71) Applicant: AUDI AG, Ingolstadt (DE)

(72) Inventors: Bernd Barra, Munich (DE); Jan Reiker, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/642,728

(22) PCT Filed: Sep. 17, 2018

(86) PCT No.: PCT/EP2018/075068
§ 371 (c)(1),
(2) Date: Feb. 27, 2020

(87) PCT Pub. No.: WO2019/057663
PCT Pub. Date: Mar. 28, 2019

(65) Prior Publication Data
US 2021/0071595 A1    Mar. 11, 2021

(30) Foreign Application Priority Data

Sep. 25, 2017 (DE) .......................... 102017216978.8

(51) Int. Cl.
*F02D 17/02* (2006.01)
*F01N 3/10* (2006.01)
(Continued)

(52) U.S. Cl.
CPC ............... *F02D 17/02* (2013.01); *F01N 3/10* (2013.01); *F02D 37/02* (2013.01);
(Continued)

(58) Field of Classification Search
CPC ...... F02D 17/02; F02D 37/02; F02D 41/0087; F02D 41/0235; F02D 2200/0802;
(Continued)

(56) References Cited

U.S. PATENT DOCUMENTS 4,274,373 A * 6/1981 Sugasawa ............... F02D 17/02
60/276
5,382,205 A * 1/1995 Togai ................ B60W 30/1819
477/43
(Continued)

FOREIGN PATENT DOCUMENTS

CN             1484732 A     3/2004
CN           101576016 A    11/2009
(Continued)

OTHER PUBLICATIONS

Translation of International Preliminary Report on Patentability dated Apr. 9, 2020 from International Patent Application No. PCT/EP2018/075068, 8 pages.
(Continued)

*Primary Examiner* — John M Zaleskas
(74) *Attorney, Agent, or Firm* — Staas & Halsey LLP

(57) ABSTRACT

An internal combustion engine with a plurality of cylinders is a drive device in which the drive torque available can be reduced. The ignition timing which is set at the internal combustion engine is adjusted in the retarded direction starting from an initial ignition timing until the ignition timing corresponds to a threshold ignition timing. To reduce the drive torque further, at least one cylinder, among the plurality of cylinders, is deactivated by suspending fuel injection into the cylinder, and the remaining cylinder(s) continue to be operated with fuel injection using the ignition timing. The remaining cylinders of the internal combustion engine which continue to be operated are supplied with a quantity of fuel which is larger in comparison with an initial
(Continued)

quantity of fuel present before the cylinder deactivation, to set a substoichiometric fuel/oxygen ratio.

17 Claims, 2 Drawing Sheets

(51) Int. Cl.
    *F02D 41/02*     (2006.01)
    *F02D 41/14*     (2006.01)
    *F02D 41/38*     (2006.01)
    *F02P 5/15*     (2006.01)
    *F02D 37/02*     (2006.01)
    *F02P 5/04*     (2006.01)
    *F02D 41/00*     (2006.01)

(52) U.S. Cl.
    CPC ..... *F02D 41/0087* (2013.01); *F02D 41/0235* (2013.01); *F02D 41/1454* (2013.01); *F02D 41/38* (2013.01); *F02P 5/045* (2013.01); *F02P 5/1502* (2013.01); *F02P 5/1504* (2013.01); *F02P 5/1512* (2013.01); *F02D 2041/389* (2013.01); *F02D 2200/0614* (2013.01); *F02D 2200/0802* (2013.01); *F02D 2200/0814* (2013.01); *F02D 2200/1002* (2013.01); *F02D 2200/50* (2013.01)

(58) Field of Classification Search
    CPC ......... F02D 2200/0814; F02D 2250/18; F02D 2250/21; F02P 5/045; F02P 5/1504; F01N 3/10
    See application file for complete search history.

(56) References Cited

U.S. PATENT DOCUMENTS

| | | | | |
|---|---|---|---|---|
| 5,459,662 | A * | 10/1995 | Tezuka | F02P 5/1504 701/86 |
| 5,463,551 | A * | 10/1995 | Milunas | B60K 28/16 701/91 |
| 5,479,898 | A * | 1/1996 | Cullen | F02P 5/045 123/350 |
| 5,540,204 | A * | 7/1996 | Schnaibel | F02D 41/0087 123/481 |
| 5,559,703 | A * | 9/1996 | Iwata | B60K 28/16 123/333 |
| 5,758,493 | A * | 6/1998 | Asik | F02D 41/0082 60/274 |
| 5,797,371 | A * | 8/1998 | Nonaka | F02D 17/02 123/481 |
| 5,813,936 | A * | 9/1998 | Kichima | B60K 28/165 477/97 |
| 5,845,492 | A * | 12/1998 | Isobe | F02M 26/36 60/284 |
| 6,023,929 | A * | 2/2000 | Ma | F02D 41/0087 60/295 |
| 6,209,526 | B1 * | 4/2001 | Sun | F02B 17/00 123/295 |
| 6,360,713 | B1 * | 3/2002 | Kolmanovsky | F02D 17/02 123/295 |
| 6,904,752 | B2 | 6/2005 | Foster et al. | |
| 7,182,050 | B2 | 2/2007 | Hitomi et al. | |
| 2002/0038543 | A1 | 4/2002 | Nishimura et al. | |
| 2003/0213468 | A1 * | 11/2003 | Rayl | F02D 41/0087 123/406.26 |
| 2003/0224907 | A1 * | 12/2003 | Surnilla | F02D 37/02 477/182 |
| 2005/0197759 | A1 * | 9/2005 | Surnilla | F02D 17/02 701/103 |
| 2006/0030998 | A1 * | 2/2006 | Surnilla | F02D 41/0235 701/112 |
| 2006/0200298 | A1 * | 9/2006 | Jehle | F02D 41/1443 701/104 |
| 2009/0107458 | A1 * | 4/2009 | Surnilla | F02D 41/0082 123/406.23 |
| 2009/0118977 | A1 * | 5/2009 | Whitney | F02D 37/02 701/103 |
| 2009/0150059 | A1 * | 6/2009 | Santoso | F02D 41/064 701/113 |
| 2010/0063710 | A1 * | 3/2010 | Asai | F02D 41/403 701/103 |
| 2010/0082220 | A1 * | 4/2010 | Whitney | F02D 11/105 701/102 |
| 2011/0130902 | A1 * | 6/2011 | Heisei | B60W 10/08 701/22 |
| 2011/0270509 | A1 * | 11/2011 | Whitney | F02P 5/045 701/103 |
| 2012/0174892 | A1 * | 7/2012 | Ruhland | F02P 5/1508 123/406.44 |
| 2013/0045832 | A1 * | 2/2013 | Whitney | F02D 41/0002 477/3 |
| 2013/0045835 | A1 * | 2/2013 | Schang | B60W 10/06 477/78 |
| 2015/0051809 | A1 * | 2/2015 | Glugla | F02D 43/00 701/103 |
| 2015/0051816 | A1 * | 2/2015 | Glugla | F02D 41/0245 701/108 |
| 2015/0345407 | A1 * | 12/2015 | Glugla | F02D 41/345 123/403 |
| 2016/0115878 | A1 * | 4/2016 | VanDerWege | F02D 41/0087 123/333 |
| 2016/0115884 | A1 * | 4/2016 | VanDerWege | F02P 9/002 123/481 |
| 2017/0254278 | A1 * | 9/2017 | Ohisa | F02D 37/02 |
| 2018/0073455 | A1 * | 3/2018 | Barra | F02D 41/10 |
| 2020/0018252 | A1 * | 1/2020 | Langegger | F02D 17/02 |
| 2020/0340414 | A1 * | 10/2020 | Nee | B01D 46/0057 |

FOREIGN PATENT DOCUMENTS

| | | | |
|---|---|---|---|
| CN | 102220917 A | 10/2011 | |
| CN | 105545499 A | 5/2016 | |
| DE | 100 51 424 A1 | 5/2001 | |
| DE | 101 57 104 A1 | 9/2002 | |
| DE | 103 22 963 A1 | 12/2003 | |
| DE | 103 48 107 A1 | 5/2005 | |
| DE | 102004031296 A1 | 2/2006 | |
| DE | 102012022153 A1 * | 5/2014 | ......... F02D 41/0087 |
| DE | 102017216978.8 | 9/2017 | |
| GB | 1 500 882 | 2/1978 | |
| JP | 2008-267294 | 11/2008 | |
| JP | 2010236398 A * | 10/2010 | ......... F02D 41/029 |
| JP | 2014-185562 | 10/2014 | |
| JP | 2015-90110 A | 5/2015 | |
| WO | 2014/087067 A1 | 6/2014 | |
| WO | PCT/EP2018/075068 | 9/2018 | |

OTHER PUBLICATIONS

Translation of Written Opinion and International Search Report dated Dec. 10, 2018 from International Patent Application No. PCT/EP2018/075068, 8 pages.

International Search Report for PCT/EP2018/075068; dated Dec. 10, 2018.

Chinese Office Action dated Nov. 4, 2021 from Chinese Application No. 201880050072.3.

Chinese Office Action dated Jul. 19, 2022 for Chinese Application No. 201880050072.3, with English language summary of Examiner's comments.

* cited by examiner

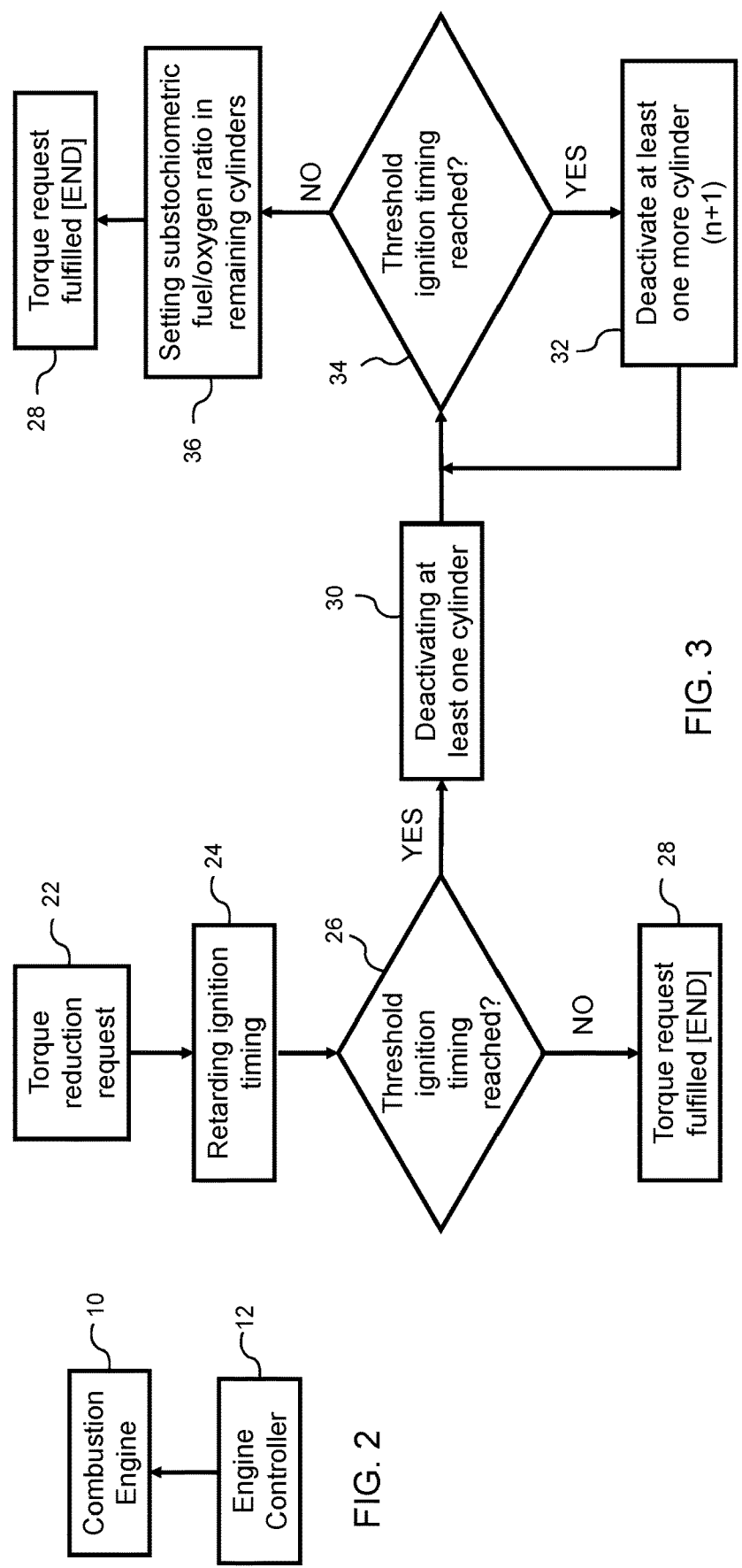

METHOD FOR OPERATING A DRIVE DEVICE AND CORRESPONDING DRIVE DEVICE

CROSS REFERENCE TO RELATED APPLICATIONS

This application is the U.S. national stage of International Application No. PCT/EP2018/075068, filed Sep. 17, 2018 and claims the benefit thereof. The International Application claims the benefit of German Application No. 102017216978.8 filed on Sep. 25, 2017, both applications are incorporated by reference herein in their entirety.

BACKGROUND

Described below is a method for operating and a drive device which has an internal combustion engine with a plurality of cylinders, wherein, in order to reduce a drive torque which is made available by the internal combustion engine, an ignition time which is set at the internal combustion engine is adjusted in the retarded direction starting from an initial ignition time until the ignition time corresponds to a threshold ignition time, and in order to reduce the drive torque further, at least one cylinder, which is to be deactivated, of the plurality of cylinders is deactivated by suspending a fuel injection into the cylinder, and the remaining cylinder or cylinders continue to be operated with fuel injection using the ignition time.

The drive device serves, for example, to drive a motor vehicle, in this respect therefore to make available a drive torque which is directed to driving the motor vehicle. The drive torque is made available at least temporarily and/or at least partially by the internal combustion engine which is a component of the drive device.

From time to time it may be necessary to reduce the drive torque which is made available by the internal combustion engine. In order to achieve a reasonable and high-performance system response of the drive device, it is useful to obtain a largest possible proportion of the drive torque by adjusting the ignition time, and on the other hand a smallest possible proportion by throttling the internal combustion engine. This applies, in particular, if the internal combustion engine is turbo-charged, that is to say has a turbo-charger to which exhaust gas which is generated by the internal combustion engine is supplied and which utilizes the enthalpy or flow energy contained in the exhaust gas to compress fresh gas which is to be supplied to the internal combustion engine.

In order to reduce the drive torque, the ignition time which is set at the internal combustion engine is now initially to be adjusted in the retarded direction starting from the initial ignition time present before the reduction of the drive torque. This is carried out until the ignition time is equal to the threshold ignition time which corresponds, for example, to a latest possible ignition time of the internal combustion engine. Up to the latest possible ignition time, satisfactory operation of the internal combustion engine is possible, in particular under customary and environmental conditions. If the ignition time has reached the threshold ignition time, that is to say for example the latest possible ignition time, the drive torque of the internal combustion engine cannot be reduced further by adjusting the ignition time.

There is therefore provision to perform a cylinder deactivation in the scope of which the cylinder which is to be deactivated is deactivated. This is done by suspending the fuel injection. In other words, the during the cylinder deactivation no fuel is injected into the cylinder. In contrast, the remaining cylinder or cylinders continue to be supplied with fuel, and the fuel therefore continues to be carried out. Ignition also continues to be carried out in the remaining cylinder or cylinders, specifically at the ignition time which can correspond to the threshold ignition timing. However, the ignition point may be determined during the cylinder deactivation in accordance with at least one operating parameter of the internal combustion engine. For example a torque which is requested by the internal combustion engine, a cylinder charge and/or the number of deactivated cylinders and/or the number of remaining cylinders is/are used as operating parameters.

Document DE 10 2004 031 296 A1 for example, is known from the related art. The document relates to a method for operating an internal combustion engine. In the case of the internal combustion engine, operating parameters which are valid within the vicinity of a steady state are specified for the operation of the internal combustion engine. The values of a first part of the operating parameters are known here, the values of a second part of the operating parameters are determined on the basis of a model such that the internal combustion engine generates a setpoint torque. As soon as a non-steady state occurs while the internal combustion engine is operating, there is a changeover from model-based determination to ignition-synchronous determination of the values of operating parameters.

SUMMARY

The method for operating a drive device described below has advantages over known methods, in particular to ensure a reduction in the emission of pollutants from the internal combustion engine in the case of deactivation of the cylinders which are to be deactivated as well as during the cylinder deactivation. This is achieved by the remaining cylinders of the internal combustion engine which continue to be operated being supplied with a quantity of fuel which is larger in comparison with an initial quantity of fuel present before the cylinder deactivation, in order to set a substoichiometric fuel/oxygen ratio.

In the case of the cylinder deactivation, the cylinders which are to be deactivated are deactivated by suspending the fuel injection. At the same time, the remaining cylinder or cylinders which continue to be operated are supplied with fuel. At the same operating point, that is to say under otherwise unchanged operating conditions of the internal combustion engine, the cylinder deactivation would cause the quantity of fuel supplied to the internal combustion engine or the cylinders to drop severely in comparison with the quantity of oxygen supplied to the internal combustion engine or to the cylinders, so that although the same fuel/oxygen ratio continues to be present in the cylinders which continue to be operated as that before the cylinder deactivation, the combined exhaust gas of all the cylinders of the internal combustion engine is lean, that is to say has an excess of oxygen in comparison with the stoichiometric ratio between the quantity of fuel and the quantity of oxygen.

This leads to a situation in which an exhaust gas purification device, in particular a catalytic converter, which is arranged downstream of the internal combustion engine, such as a three-way catalytic converter, cannot completely convert the pollutants contained in the exhaust gas of the internal combustion engine. Owing to the excess of oxygen in the exhaust gas, the conversion performance of the exhaust gas purification device would drop drastically, in particular for nitrogen oxides. In order to avoid this, the fuel/oxygen ratio is to be set to the substoichiometric fuel/oxygen ratio by supplying the relatively large quantity of fuel.

This means that in the exhaust gas generated by the internal combustion engine during the cylinder deactivation, there is always an overall deficiency of oxygen. This measure reduces the nitrogen oxide raw emissions generated by the internal combustion engine because the temperature is reduced by the enrichment of the mixture. A large part of the nitrogen oxide raw emissions can be attributed to the so-called Zeldovich mechanism which describes the exponential relationship of temperature and the generation of thermal nitrogen oxides. A reduction in the temperature in the cylinders which continue to be operated, which is brought about by enriching the mixture, therefore has a large influence on the nitrogen oxide raw emissions. The substoichiometric combustion also shows a significantly lower residual oxygen content behind the flame front so that significantly fewer reactants are present for the nitrogen oxide raw emissions. As a result of the simultaneously lower temperature, the lower oxygen content reacts even less to produce nitrogen oxide owing to the abovementioned Zeldovich mechanism.

Furthermore, a deficiency of oxygen is brought about in the overall exhaust gas generated by the internal combustion engine so that the exhaust gas purification device can also effectively convert or reduce the nitrogen oxides. The quantity of fuel which is larger in comparison with the initial quantity of fuel is intended to be present, in particular, at the same operating point, that is to say at the same drive torque and/or the same rotational speed of the internal combustion engine. If the operating point changes during the cylinder deactivation, for example as a result of a change in the drive torque and/or in the rotational speed, of course deviations can occur. For example, the initial quantity of fuel then corresponds to a quantity of fuel which is theoretically present without a cylinder deactivation.

Wherever a plural is used within the scope of this description of the deactivated cylinders, this can in all cases also be understood to mean merely a single deactivated cylinder. The opposite applies to the remaining cylinders which continue to be operated, in that merely a single cylinder that continues to be operated can also be present. For the sake of linguistic consistency, the plural is used in both cases.

Within the scope of a further refinement there is provision that the cylinders which continue to be operated are supplied with a quantity of oxygen which remains the same with respect to an initial quantity of oxygen present before the cylinder deactivation. This also may be applied at the same operating point. In so far as the operating point changes during the cylinder deactivation, changes can also occur here. The initial quantity of oxygen corresponds in this case, for example, to a theoretical quantity of oxygen which would be fed to the internal combustion engine without the cylinder deactivation. However, when the operating point is the same, the quantity of oxygen which is supplied to the cylinders which continue to be operated remains the same despite the cylinder deactivation. This may be applied to all cylinders so that not only the cylinders which continue to be operated but also the cylinders which are deactivated are each supplied with this same quantity of oxygen as before the cylinder deactivation.

One development provides that during the cylinder deactivation fresh gas is fed through the deactivated cylinders and is discharged as exhaust gas. Fresh gas is understood to be a mixture of fresh air and exhaust gas in any proportions. The fresh gas can be composed, for example, only of fresh air or—in the case of exhaust gas recirculation—can have a proportion of exhaust gas. The fresh air contains in turn a proportion of oxygen. During the cylinder deactivation, only the fuel injection is to be deactivated for the deactivated cylinder. Further operating parameters of the deactivated cylinders may remain the same, in particular opening times and/or closing times of inlet valves and/or outlet valves of the deactivated cylinders.

The deactivated cylinders serve in this respect to feed fresh gas through them. Accordingly the fresh gas is discharged as exhaust gas from the cylinders. The exhaust gas of the deactivated cylinders corresponds here to the fresh gas which is present in a chemically unchanged form, that is to say it is not subjected to any chemical reaction, in particular is not used for the combustion of fuel, while it is fed through the deactivated cylinders.

A further embodiment provides that exhaust gas of the cylinders which continue to be operated and of the deactivated cylinders is combined downstream of outlet valves, and that the quantity of fuel during the cylinder deactivation is selected in such a way that the exhaust gas has a stoichiometric composition or corresponds to a maximum quantity of fuel. The term stoichiometric composition of the exhaust gas is to be understood as meaning a composition which corresponds to the composition in the case of stoichiometric operation in the internal combustion engine using all the cylinders. During the cylinder deactivation, the substoichiometric fuel/oxygen ratio is therefore to be present in the cylinders which continue to be operated, so that after the combustion which occurs in the cylinders, a deficiency of oxygen is also present in the exhaust gas which results therefrom. In contrast, the fresh gas, and correspondingly the oxygen contained therein, are fed through the deactivated cylinders in a chemically unchanged form.

The overall exhaust gas which is generated by the internal combustion engine therefore has, when viewed in a chronologically resolved fashion, alternately a deficiency of oxygen and an excess of oxygen depending on the respective ignition sequence of the cylinders of the internal combustion engine. However, the stoichiometric composition is intended to become established when viewed averaged over time. For this purpose, the quantity of fuel which is supplied to the cylinders which continue to be operated is correspondingly adapted, that is to say the quantity of oxygen which is fed through the deactivated cylinders or fed through is also taken into account. The establishment of the stoichiometric composition ensures that the exhaust gas purification device which has already been mentioned above can convert not only nitrogen oxides but also carbon monoxide and/or hydrocarbons with high conversion rates.

If the stoichiometric composition of the exhaust gas, in particular the stoichiometric composition averaged over time cannot be achieved, for example at high levels of blanking out, the cylinders which continue to be operated should nevertheless be operated substoichiometrically. Bringing about the stoichiometric composition makes it possible, for example, to prevent an excessively small maximum quantity of fuel for the cylinders which continue to be operated. The term maximum quantity of fuel is to be understood as being that maximum quantity of fuel at which reliable operation of the internal combustion engine is still possible, in particular sufficient combustion stability is given and/or the temperature of the exhaust gas purification device does not exceed a limiting value. As a result of the substoichiometric composition in the cylinders which continue to be operated and the superstoichiometric composition averaged over time, the nitrogen oxide raw emissions in the cylinders which continue to be operated are minimized and at least partial conversion is brought about in the exhaust gas purification device by the chronologically resolved substoichiometric exhaust gas branches of the cylinders which continue to be operated.

A further refinement provides that the exhaust gas of the internal combustion engine is supplied to an exhaust gas purification device, and that a temperature in the exhaust gas purification device is determined, wherein when a limiting value is exceeded by the temperature the quantity of fuel is reduced in the direction of the initial quantity of fuel and/or a quantity of fresh gas supplied to the internal combustion engine is increased and/or the ignition time is adjusted in the early direction starting from the threshold ignition time, and/or a further cylinder is deactivated. The adjustment of the ignition time of the internal combustion engine in the retarded direction increases the temperature of the exhaust gas so that high temperatures are also applied to the exhaust gas purification device.

In order to avoid temperature-induced adverse effects on the exhaust gas purification device, the temperature in the exhaust gas purification device is now to be determined, for example by measurement and/or by estimation. In the former case, a temperature sensor can be arranged in the exhaust gas purification device, by which temperature sensor the temperature of the exhaust gas in the exhaust gas purification device and/or the exhaust purification device itself is determined. Alternatively, it is, of course, possible to estimate the temperature, for example using a temperature model.

If the temperature determined in this way then exceeds the limiting value, measures are to be taken in order to reduce the temperature in the exhaust gas purification device. For this purpose, for example the quantity of fuel which is supplied to the cylinders which continue to be operated is reduced. Alternatively, or additionally, there may be provision that the quantity of fresh gas which is supplied to the internal combustion engine is increased and/or the ignition time is adjusted again in the early direction and/or a further cylinder is deactivated. At least one of these measures may be carried out until the temperature in the exhaust gas purification device corresponds to the limiting value or is lower than the limiting value. If all the cylinders of the internal combustion engine are operated, the quantity of fuel can be increased in order to reduce the temperature.

One development provides that the internal combustion engine is supplied with the larger quantity of fuel in an enrichment time period, wherein the enrichment time period starts before the cylinder deactivation and/or ends after the cylinder deactivation. The enrichment time period is to be understood as being that time period during which the internal combustion engine is supplied with a quantity of fuel which is dimensioned in such a way that the substoichiometric fuel/oxygen ratio is implemented in the cylinders of the internal combustion engine, that is to say there is a deficiency of air. Outside the cylinder deactivation, this relatively large quantity of fuel may be supplied to all the cylinders of the internal combustion engine, that is to say both to the cylinders which are deactivated during the cylinder deactivation and to the cylinders which continue to be operated.

The enrichment time period may begin before the cylinder deactivation. Alternatively or additionally, it ends only after the cylinder deactivation. There is therefore provision firstly to supply the internal combustion engine with the relatively large quantity of fuel and only subsequently to deactivate the cylinders which are to be deactivated. Analogously there may be provision to activate the deactivated cylinders again and only subsequently end the enrichment time period. At the beginning of the enrichment time period before the cylinder deactivation, for example the exhaust gas purification device can already be prepared for the cylinder deactivation and correspondingly conditioned. If the enrichment time period extends beyond the cylinder deactivation, oxygen buffered in the exhaust gas purification device can be driven out of it.

A further embodiment provides that the enrichment time period is initiated if a change in torque is predicted on the basis of at least one operating parameter of the drive device. It has already been explained at the beginning that the cylinder deactivation is carried out when the drive torque of the internal combustion engine is to be reduced. Given such a change in torque it is useful in this respect already to perform the abovementioned conditioning of the exhaust gas purification device. Correspondingly, the enrichment time period is already intended to begin if the change in torque will occur with a certain probability in the future.

One development provides that the change in torque is predicted if the operating point approaches a transmission shift point and/or a tire slip approaches a slip limit. The transmission shift point is to be understood as being an operating point at which a gear speed change of a multi-gear transmission which is connected to the internal combustion engine occurs. Within the scope of a gear speed change of this multi-speed transmission the torque which is requested by the internal combustion engine changes frequently, and correspondingly the drive torque which is made available by the internal combustion engine also changes frequently. The change in torque may be predicted if the operating point approaches the transmission shift point, that is to say changes in the direction thereof, and at the same time the expected gear speed change will entail a reduction in the drive torque.

Additionally or alternatively, the change in the drive torque can be predicted if the tire slip approaches the slip limit. The tire slip is the slip which actually occurs at the tires of the motor vehicle. As soon as this tire slip lies within a certain range around the slip limit and changes further in the direction thereof it is possible to expect a reduction in the drive torque which is initiated, for example, by a driver assistance device of the motor vehicle.

Finally, within the scope of one embodiment there is provision that the enrichment time period is ended after the cylinder deactivation ends, as soon as an oxygen filling level of an oxygen accumulator of the exhaust gas purification device has reached a setpoint filling level. Owing to the cylinder deactivation and the feeding through of fresh gas through the deactivated cylinders, the oxygen accumulator of the exhaust gas purification device becomes filled during the cylinder deactivation, or at least changes. In order to return the oxygen filling level to its setpoint filling level after the cylinder deactivation, the enrichment time period is made to extend beyond the cylinder deactivation.

As soon as the desired objective is reached, specifically the oxygen filling level corresponds to the setpoint filling level, the enrichment time period is ended and the internal combustion engine is operated again with the initial quantity of fuel or a fuel/oxygen ratio which is used outside the cylinder deactivation, specifically in particular a stoichiometric fuel/oxygen ratio.

The drive device for carrying out the method according to the statements above has an internal combustion engine with a plurality of cylinders and, in order to reduce a drive torque which is made available by the internal combustion engine, is designed to adjust an ignition time, set at the internal combustion engine, in the retarded direction, starting from an initial ignition time, until the ignition time corresponds to a threshold ignition time, and, in order to reduce the drive torque, is designed to deactivate at least one cylinder, which is to be deactivated, of the plurality of cylinders by suspending fuel injection into the cylinder and to continue to operate the remaining cylinder or cylinders with fuel injection using the ignition time. There is provision that the remaining cylinders of the internal combustion engine, which continue to be operated, are supplied at the same operating point with a quantity of fuel which is larger in comparison with an initial quantity of fuel present before the cylinder deactivation, in order to set a substoichiometric fuel/oxygen ratio. It is to be noted that the ignition time during the cylinder deactivation can correspond to the threshold ignition time, but can also be earlier than the time.

The advantages of such a refinement of the drive device or of such a procedure have already been pointed out. Both the drive device and the method for operating it can be developed according to the statements above, so that in this respect reference is made thereto.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 2 is block diagram of the drive device; and

FIG. 3 is a flowchart of a method performed by the drive device.

DETAILED DESCRIPTION OF THE PREFERRED EMBODIMENT

Figure 1:
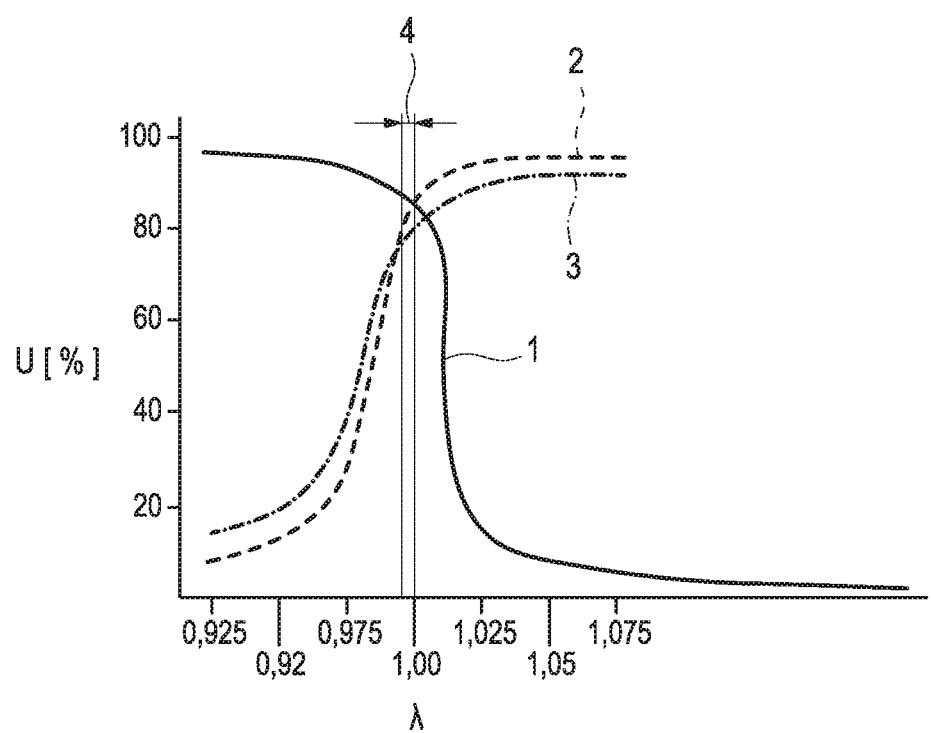
FIG. 1 is a graph in which conversion rates of an exhaust gas purification device of a drive device are illustrated.

Reference will now be made in detail to the preferred embodiments, examples of which are illustrated in the accompanying drawings, wherein like reference numerals refer to like elements throughout.

FIG. 1 is a graph in which a conversion rate U, which is specified as a percentage, is plotted against the fuel/oxygen ratio $\lambda$. In the case where $\lambda=1$, a stoichiometric fuel/oxygen ratio is present, in the case where $\lambda<1$ a rich ratio is present and in the case where $\lambda>1$ a lean ratio is present. The conversion rate U for nitrogen oxides is illustrated by a profile 1, that for carbon monoxide is illustrated by a profile 2, and that for hydrocarbons is illustrated by a profile 3. It is clear that comparatively high conversions are achieved for all three profiles 1, 2 and 3 within a lambda window 4.

In the case of a method for operating a drive device as illustrated in FIG. 2 which has an internal combustion engine 10 and an engine controller 12, there is now provision, as illustrated in FIG. 3, that a request 22 to reduce a drive torque which is made available by the internal combustion engine an ignition time which is set at the internal combustion engine is adjusted in the retarded direction 24 starting from an initial ignition time. The adjustment of the ignition time occurs here for all cylinders of the internal combustion engine. The adjustment of the ignition time in the retarded direction already implements a reduction in the drive torque. The other operating parameters of the internal combustion engine may remain the same—at the same operating point. In particular, the cylinders are firstly supplied with the same quantity of fuel and the same quantity of oxygen as before the adjustment of the ignition time.

The adjustment of the ignition time in the retarded direction increases the temperature of the exhaust gas generated by the internal combustion engine. However, such an increase is permissible only within certain limits, so that the ignition time is to be adjusted only up to a threshold ignition time. When the threshold ignition time is reached 26, for example, that ignition time to which the internal combustion engine can be reliably operated without an ignition misfire and/or up to which the temperature of the exhaust gas is below a specific limiting temperature, the torque request is fulfilled 28. In order to reduce the drive torque further, the fuel injection is now suspended in at least one cylinder which is to be deactivated 30, 32, so that the cylinder or the cylinders to be deactivated are ultimately deactivated. The remaining cylinders continue to be operated and are operated with fuel injection using the ignition time which can correspond to the threshold ignition time or can be earlier 34.

Owing to the deactivation of the at least one cylinder, given a constant quantity of fuel for the cylinders which continue to be operated, a large excess of oxygen would occur in the exhaust gas of the internal combustion engine. For the same reason, the cylinders which continue to be operated are to be supplied with a relatively large quantity of fuel so that a substoichiometric fuel/oxygen ratio 36, consequently therefore a deficiency of air, occurs therein. As a result, on the one hand, the nitrogen oxide raw emissions are reduced because, on the one hand, the temperature in the cylinder and, on the other hand, the residual oxygen content behind the flame front are lowered. On the other hand, the conversion rate for nitrogen oxides in an exhaust gas purification device which is connected downstream of the internal combustion engine are improved, in particular if the quantity of fuel for the cylinders which continue to be operated is selected in such a way that the overall exhaust gas which is expelled by the internal combustion engine has a stoichiometric composition or at least virtually a stoichiometric composition. This is to be understood as meaning that the exhaust gas has the same composition as in the case of stoichiometric or at least virtual stoichiometric operation of the internal combustion engine, in particular of all the cylinders of the internal combustion engine.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating a drive device, including an internal combustion engine with a plurality of cylinders, to reduce a drive torque produced by the internal combustion engine, comprising:

adjusting ignition timing set at the internal combustion engine in a retarded direction starting from an initial ignition time until the ignition timing corresponds to a threshold ignition timing;

deactivating at least one cylinder, among the plurality of cylinders, by suspending fuel injection into the at least one cylinder; and continuing to operate each remaining cylinder, among the plurality of cylinders excluding the at least one cylinder, using the threshold ignition timing and supplying each remaining cylinder of the internal combustion engine with a subsequent quantity of fuel larger than an initial quantity of fuel supplied before cylinder deactivation, thereby setting a substoichiometric fuel/oxygen ratio in each remaining cylinder, while reducing the drive torque from an initial drive torque prior to said adjusting.

2. The method according to claim 1, further comprising supplying each remaining cylinder with a quantity of oxygen equal to an initial quantity of oxygen supplied before the cylinder deactivation.

3. The method according to claim 2, further comprising, during the cylinder deactivation, feeding fresh gas through the at least one deactivated cylinder and discharging as exhaust gas.

4. The method according to claim 3, further comprising:
combining the exhaust gas of all cylinders downstream of outlet valves; and
determining the subsequent quantity of fuel supplied during the cylinder deactivation, so that the subsequent quantity of fuel is a maximum quantity of fuel.

5. The method according to claim 4, further comprising:
supplying the exhaust gas of the internal combustion engine to an exhaust gas purification device;
determining a temperature in the exhaust gas purification device; and,
in response to a limiting value being exceeded by the temperature, at least one of:
reducing the subsequent quantity of fuel to be closer to the initial quantity of fuel;
adjusting the ignition timing in an earlier direction, opposite the retarded direction, starting from the threshold ignition timing; and
deactivating another cylinder.

6. The method according to claim 5, further comprising supplying the internal combustion engine with the subsequent quantity of fuel in an enrichment time period, at least one of starting before the cylinder deactivation and ending after the cylinder deactivation.

7. The method according to claim 6, further comprising initiating the enrichment time period when a change in torque is predicted based on at least one operating parameter of the drive device.

8. The method according to claim 7, further comprising predicting the change in torque upon at least one of an operating time approaches a transmission shift point and a tire slip approaches a slip limit.

9. The method according to claim 8, further comprising ending the enrichment time period after the cylinder deactivation ends, as soon as an oxygen filling level of an oxygen accumulator of the exhaust gas purification device has reached a setpoint filling level.

10. The method according to claim 1, further comprising, during the cylinder deactivation, feeding fresh gas through the at least one deactivated cylinder and discharging as exhaust gas.

11. The method according to claim 1, further comprising:
combining exhaust gas of all cylinders downstream of outlet valves; and
determining the subsequent quantity of fuel supplied during the cylinder deactivation, so that the subsequent quantity of fuel is a maximum quantity of fuel.

12. The method according to claim 1, further comprising:
supplying exhaust gas of the internal combustion engine to an exhaust gas purification device;
determining a temperature in the exhaust gas purification device; and,
in response to a limiting value being exceeded by the temperature, at least one of:
reducing the subsequent quantity of fuel to be closer to the initial quantity of fuel;
adjusting the ignition timing in an earlier direction, opposite the retarded direction, starting from the threshold ignition timing; and
deactivating another cylinder.

13. The method according to claim 1, further comprising supplying the internal combustion engine with the subsequent quantity of fuel in an enrichment time period, at least one of starting before the cylinder deactivation and ending after the cylinder deactivation.

14. The method according to claim 13, further comprising initiating the enrichment time period when a change in torque is predicted based on at least one operating parameter of the drive device.

15. The method according to claim 14, further comprising predicting the change in torque upon at least one of an operating time approaches a transmission shift point and a tire slip approaches a slip limit.

16. The method according to claim 13, further comprising supplying exhaust gas of the internal combustion engine to an exhaust gas purification device; and
ending the enrichment time period after the cylinder deactivation ends, as soon as an oxygen filling level of an oxygen accumulator of the exhaust gas purification device has reached a setpoint filling level.

17. A drive device, comprising:
an internal combustion engine with a plurality of cylinders; and
an engine controller reducing a drive torque produced by the internal combustion engine, by
adjusting an ignition timing, set at the internal combustion engine, in a retarded direction, starting from an initial ignition timing, until the ignition timing corresponds to a threshold ignition;
deactivating at least one cylinder, among a plurality of cylinders, by suspending fuel injection into the at least one cylinder, and
continuing to operate each remaining cylinder, among the plurality of cylinders excluding the at least one cylinder, using the ignition timing and supplying each remaining cylinder of the internal combustion engine with a subsequent quantity of fuel larger than an initial quantity of fuel supplied before cylinder deactivation, thereby setting a substoichiometric fuel/oxygen ratio in each remaining cylinder, while reducing the drive torque from an initial drive torque before the ignition timing is adjusted.

* * * * *